United States Patent
Dashiff et al.

(10) Patent No.: US 6,584,123 B1
(45) Date of Patent: Jun. 24, 2003

(54) APPARATUS FOR UTILIZING SPARE E1 CHANNELS

(75) Inventors: Ethan I. Dashiff, Passaic, NJ (US); Victoria Y Jin, Taikoo Shing (HK); Lucy Ann Tscherne, Madison, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/476,343

(22) Filed: Jan. 3, 2000

(51) Int. Cl.[7] .................................................. H04J 3/00
(52) U.S. Cl. ...................................................... 370/498
(58) Field of Search ................................ 370/498, 465, 370/464, 466, 467, 470, 472, 476, 358, 359, 366, 375, 376, 419, 420, 437, 532, 535, 536, 537, 538, 539, 540, 541, 542, 544

(56) References Cited

U.S. PATENT DOCUMENTS

| | | | | |
|---|---|---|---|---|
| 4,589,108 A | * | 5/1986 | Billy | 370/503 |
| 4,595,907 A | * | 6/1986 | Huffman et al. | 341/61 |
| 4,661,946 A | * | 4/1987 | Takahashi et al. | 370/378 |
| 5,058,104 A | * | 10/1991 | Yonehara et al. | 370/242 |
| 5,452,306 A | * | 9/1995 | Turudic et al. | 370/465 |
| 5,526,397 A | * | 6/1996 | Lohman | 455/560 |
| 5,799,019 A | * | 8/1998 | Kim et al. | 370/465 |
| 5,999,539 A | * | 12/1999 | Dashiff et al. | 370/465 |
| 6,122,288 A | * | 9/2000 | Dashiff et al. | 370/465 |

FOREIGN PATENT DOCUMENTS

| | | | | |
|---|---|---|---|---|
| KR | 9310613 B1 | * | 10/1993 | H04J/3/00 |
| KR | 2001004437 A | * | 1/2001 | H04J/1/00 |
| KR | 2001009123 A | * | 2/2001 | H04Q/1/30 |

* cited by examiner

*Primary Examiner*—Dang Ton
*Assistant Examiner*—Tri Phan
(74) *Attorney, Agent, or Firm*—Kenyon & Kenyon

(57) ABSTRACT

An apparatus which enables a customer to transport data utilizing up to 7 channels which frequently go unused when 24 channels of unframed T1 data are transported utilizing 24 of the 32 channels available through E1 is disclosed. A multiplexer receives 24 64 Kbps channels of unframed T1 data at a first interface and up to 7 64 Kbps channels of data at a second interface. The data received at the first and second interfaces is multiplexed into 32 64 Kbps channels in accordance with the E1 standard.

4 Claims, 1 Drawing Sheet

APPARATUS FOR UTILIZING SPARE E1 CHANNELS

BACKGROUND

The present invention relates generally to E1 timeslots which go unused when T1 payloads are transported on E1 frames. More particularly, the present invention relates to an apparatus which enables a customer to transport data utilizing up to 7 channels which frequently go unused when 24 channels of unframed T1 data are transported utilizing 24 of the 32 channels available through E1.

In Europe, the most popular standard for transmitting digital voice data is known as E1. E1 was devised by the International Telecommunications Union-Telecommunication Standardization Sector (ITU-T). The name E1 was given by the Conference of European Postal and Telecommunication Administration (CEPT). In accordance with the E1 standard, 32 standardized 64 Kbps channels (also referred to herein as "timeslots") carry digital data at a rate of 2.048 Mbps. In the United States, the most popular standard for transmitting digital voice data is known as T1. T1 was introduced by the Bell System in the 1960's. In accordance with the T1 standard, 24 standardized 64 Kbps channels carry digital data at a rate of 1.544 Mbps.

Frequently, customers in Europe wish to transport T1 data to the United States. These customers typically provision E1 service to their premises and transport the 24 channel T1 payload to the United States utilizing 24 of the 32 E1 channels provisioned to their premises. One of the 8 remaining E1 channels is utilized for framing. Thus, up to 7 E1 channels which might be utilized to transport data go unused when the European customer transports T1 data utilizing E1.

In view of the above, it can be appreciated that there is a need for an apparatus which solves the above described problems.

SUMMARY OF THE INVENTION

The present invention provides an apparatus for multiplexing 24 channels of unframed T1 data onto an E1 frame. According to one embodiment of the present invention, a multiplexer receives 24 64 Kbps channels of unframed T1 data at one interface and up to 7 64 Kbps channels of additional data at a second interface. The data received at these two interfaces is multiplexed into E1 format and output at a third interface.

DETAILED DESCRIPTION

Figure 1:
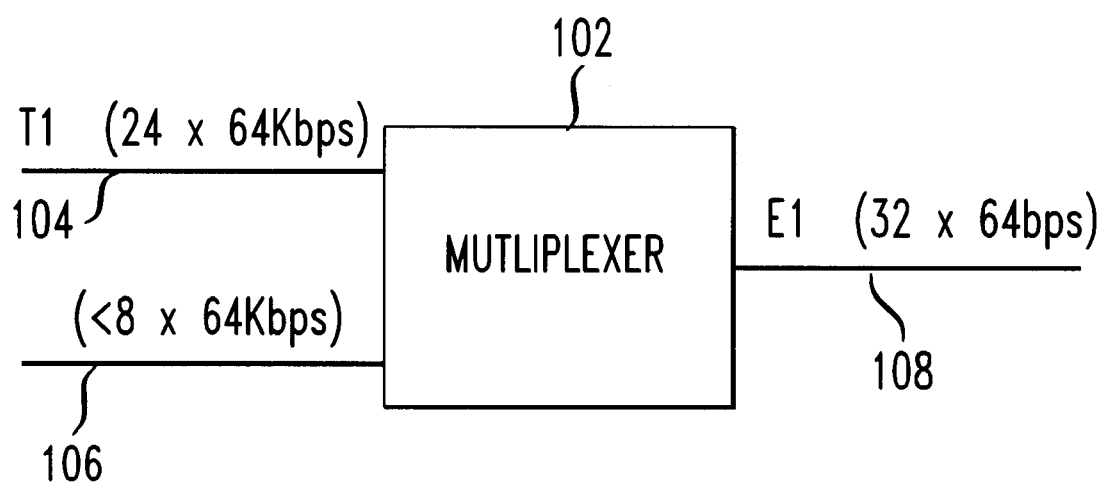
FIG. 1 is a block diagram of an apparatus in accordance with an embodiment of the present invention.

The present invention relates to an apparatus which enables a customer to transport data utilizing up to 7 channels which frequently go unused when 24 channels of unframed T1 data are transported utilizing 24 of the 32 channels available through E1.

FIG. 1 is a block diagram of an apparatus in accordance with an embodiment of the present invention. In FIG. 1, a multiplexer 102 comprises three interfaces. Interface 104 enables multiplexer 102 to exchange 24 64 Kbps channels of digital data with a source such as another multiplexer (not shown in FIG. 1). Interface 106 is a standard user serial interface which enables multiplexer 102 to exchange up to 7 64 Kbps channels of digital data with a source such as voice compression equipment, various types of video equipment and/or a router for frame relay (not shown in FIG. 1). Interface 106 may be, for example, one of the following types of interfaces: V.35 or RS 530. Interface 108 enables multiplexer 102 to exchange 32 64 Kbps channels of digital data in E1 format with a source such as another multiplexer (not shown in FIG. 1).

The apparatus of FIG. 1 operates as follows. Multiplexer 102 multiplexes unframed T1 data received at interface 104 with up to 7 64 Kbps channels of data received at interface 106. Multiplexer 102 then outputs the multiplexed data in E1 format at interface 108.

The apparatus operates similarly in reverse. First, multiplexer 102 receives E1 format data at interface 108. Multiplexer 102 then demultiplexes the receive E1 data into one 24×64 Kbps stream of data which is output at interface 104 and another stream comprising the remaining data which is output at interface 106.

Although several embodiments are specifically illustrated herein, it will be appreciated that modifications and variations of the present invention are covered by the above teachings and within the purview of the appended claims without departing from the spirit and intended scope of the invention.

What is claimed is:

1. A multiplexer for providing a thirty-two channel telecommunications interface using one twenty-four channel interface and at least one standard user serial interface, comprising:
   a twenty-four channel interface;
   at least one standard user serial interface; and
   a thirty-two channel interface, wherein said multiplexer:
      receives a first plurality of channels at the twenty-four channel interface in a twenty-four channel format;
      couples the first plurality of channels to the thirty-two channel interface;
      multiplexes up to 7 user channels input to the at least one standard user serial interface with the first plurality of channels;
      receives a second plurality of channels at the thirty-two channel interface in a thirty-two channel format;
      couples the second plurality of channels to the twenty-four channel interface;
      demultiplexes up to 7 user channels from the second plurality of channels received at the thirty-two channel interface; and
      couples the demultiplexed up to 7 user channels to the at least one standard user serial interface.

2. The multiplexer according to claim 1, wherein the twenty-four channel interface comprises a T1 interface.

3. The multiplexer according to claim 1, wherein the at least one standard user serial interface comprises one of a V.35 and an RS 530 standard interface.

4. The multiplexer according to claim 1, wherein the thirty-two channel interface comprises an E1 interface.

* * * * *